Sept. 29, 1970     A. B. EREKSON     3,530,972
APPARATUS FOR STACKING SHEETS
Filed Jan. 22, 1969     6 Sheets-Sheet 1

INVENTOR
ARTHUR B. EREKSON
BY
ATTORNEY

INVENTOR
ARTHUR B. EREKSON
BY
ATTORNEY

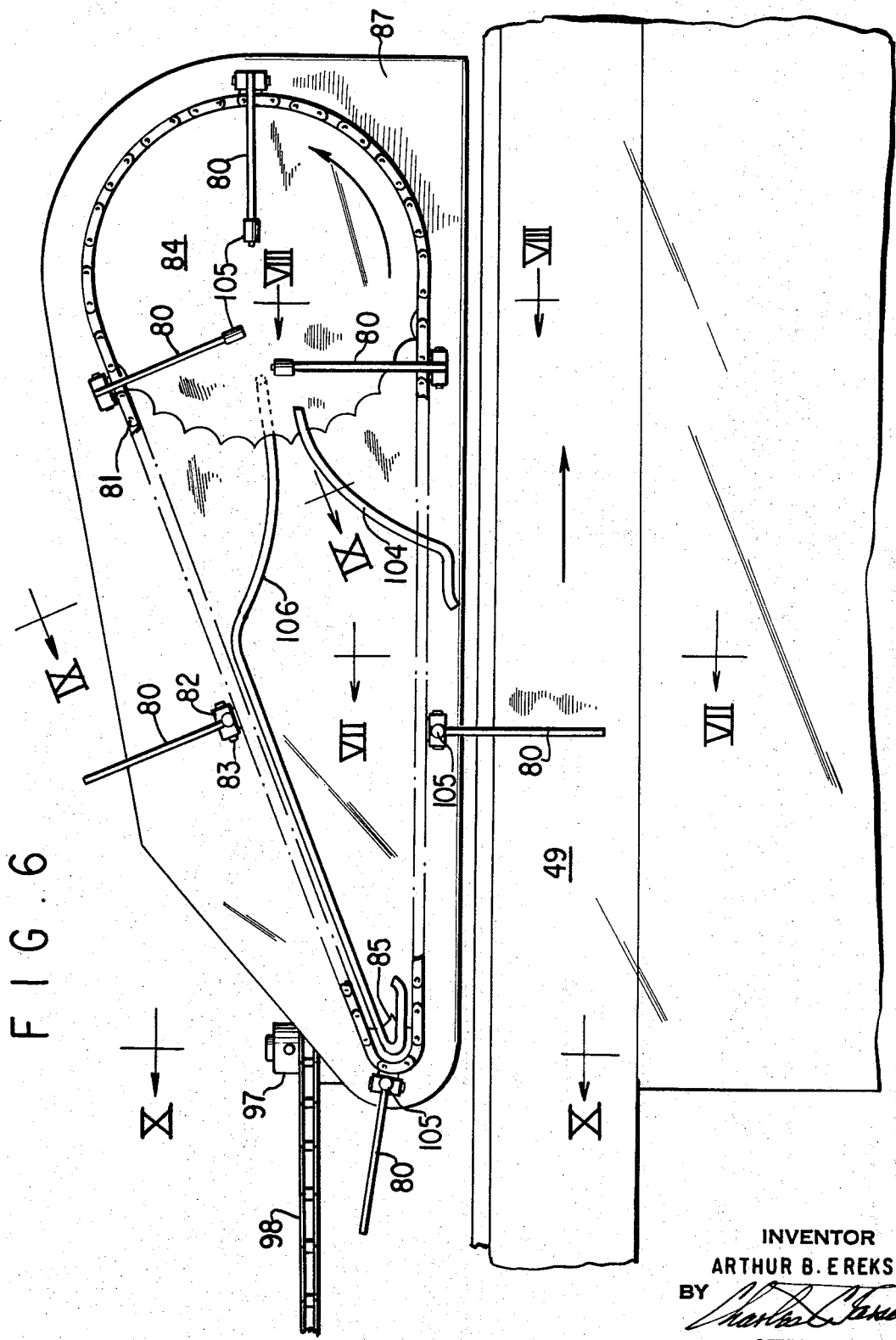

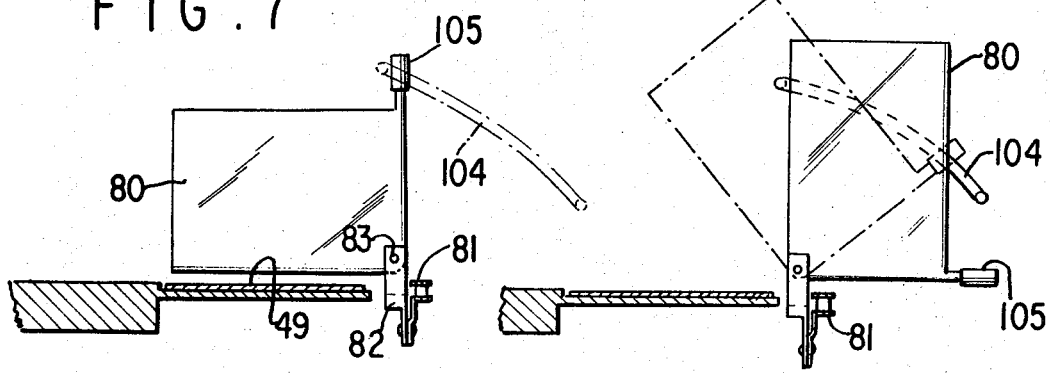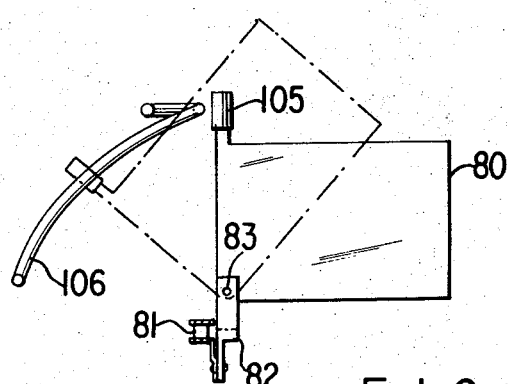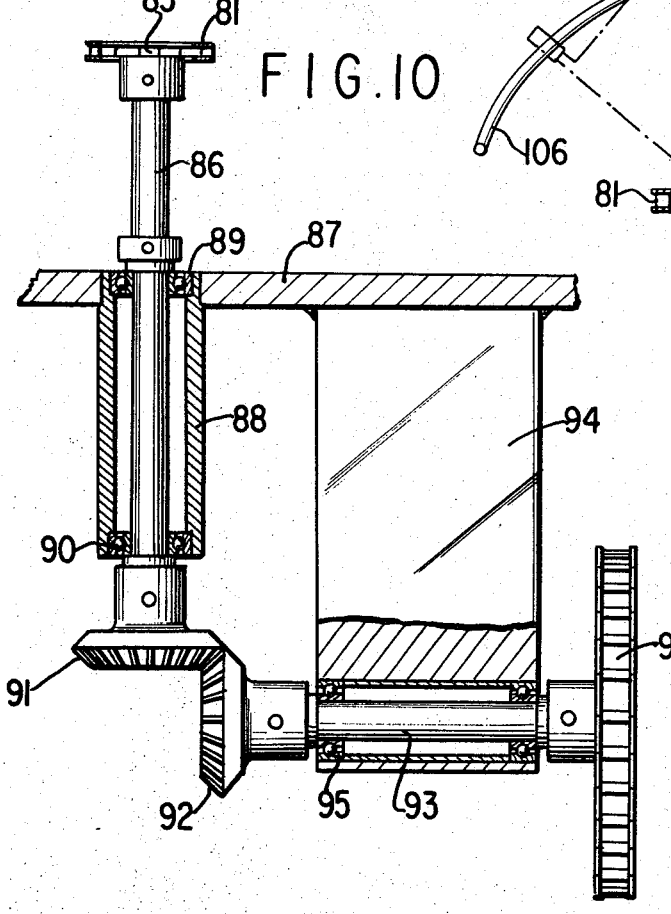

United States Patent Office 3,530,972
Patented Sept. 29, 1970

3,530,972
APPARATUS FOR STACKING SHEETS
Arthur B. Erekson, Scarsdale, N.Y., assignor to Borden Inc., New York, N.Y., a corporation of New Jersey
Filed Jan. 22, 1969, Ser. No. 793,087
Int. Cl. B65g 57/112
U.S. Cl. 198—35                      6 Claims

ABSTRACT OF THE DISCLOSURE

This invention relates to apparatus for stacking continuously fed sheets on a moving conveyor comprising first conveyor means, second conveyor means, stacking apparatus interposed between said first and second conveyor means comprising a driven shaft, an arm pivotal about an axis parallel to said driven shaft, said arm having a rotatable shaft at one end thereof, an extensible belt entrained about said driven and rotatable shaft, means for pivoting said arm through predetermined arc whereby said rotatable shaft passes through a noncircular arc and with respect to said driven shaft to reach out and position said sheets in stacks on said second conveyor means.

BACKGROUND OF THE INVENTION

Heretofore, numerous article handling apparatus have been suggested for stacking a continuous stream of rectangular sheet materials, of virtually any thickness, such as plywood, Sheetrock and the like in neat stacks of aligned vertical faces for such diverse purpose as weighing, packaging or transferring the materials. These devices conventionally include an arm, pivotal about a horizontal axis through a predetermined circular arc, which guides or directs sheets passed thereover onto one another to form the vertical stack. The arm generally includes a conveyor which advances the sheets over its length and outwardly against a fixed vertical brace on a pallet or similar base to define a smooth vertical face on the stack. When the arm has reached the top of its arc thereby displacing the uppermost sheet, the height of the stack is established and the arm pivots down to begin a new pile. A typical example of such an apparatus is disclosed in the Borthen et al. Pat. No. 2,958,433. The completed stack is usually removed by a conventional forklift to vacate the space where the new stack is to be formed.

The demands of today's highly competitive market makes it imperative that stacking apparatus be introduced capable of producing vertical stacks on a continuously moving conveyor for rapid transport to appropriate packaging or stack handling stations. Unfortunately, conventional machines stack only at a stationary location since the circular arc traveled by the arm situates each sheet, one on top of another, at a preselected position adjacent the free end of the arm.

SUMMARY OF THE INVENTION

The present invention overcomes the stated deficiencies of the prior art and has as its primary object the provision of a rotatable stacking arm, including a conveyor means thereon, whose free end moves through a noncircular arc which includes a linear dimension whereby sheets positioned by the arm are placed in neat stacks on a continuously advancing conveyor moving away from the arm. More particularly, the invention relates to a pivotally mounted arm having a rotable shaft on the free end thereof about which is entrained an extensible conveyor belt interconnected on the opposite end to a driven shaft capable of "reaching out" to position the sheets on one another on the moving conveyor.

BRIEF DESCRIPTION OF THE DRAWINGS

The various features of the apparatus of this invention will become apparent from the following detailed description set forth in connection with the accompanying drawing which relates to the preferred embodiment of the present invention and are given by way of illustration.

FIG. 6 is a top view of the moving plate arrangement of the present invention.

FIG. 7 is a cross-sectional view taken along the line VII—VII of FIG. 6.

FIG. 8 is a cross-sectional view taken along the line VIII—VIII of FIG. 6.

FIG. 9 is a cross-sectional view taken along the line X—X of FIG. 6.

FIG. 10 is a cross-sectional view taken along the line X—X of FIG. 6.

DETAILED DESCRIPTION OF THE INVENTION

Figure 1:
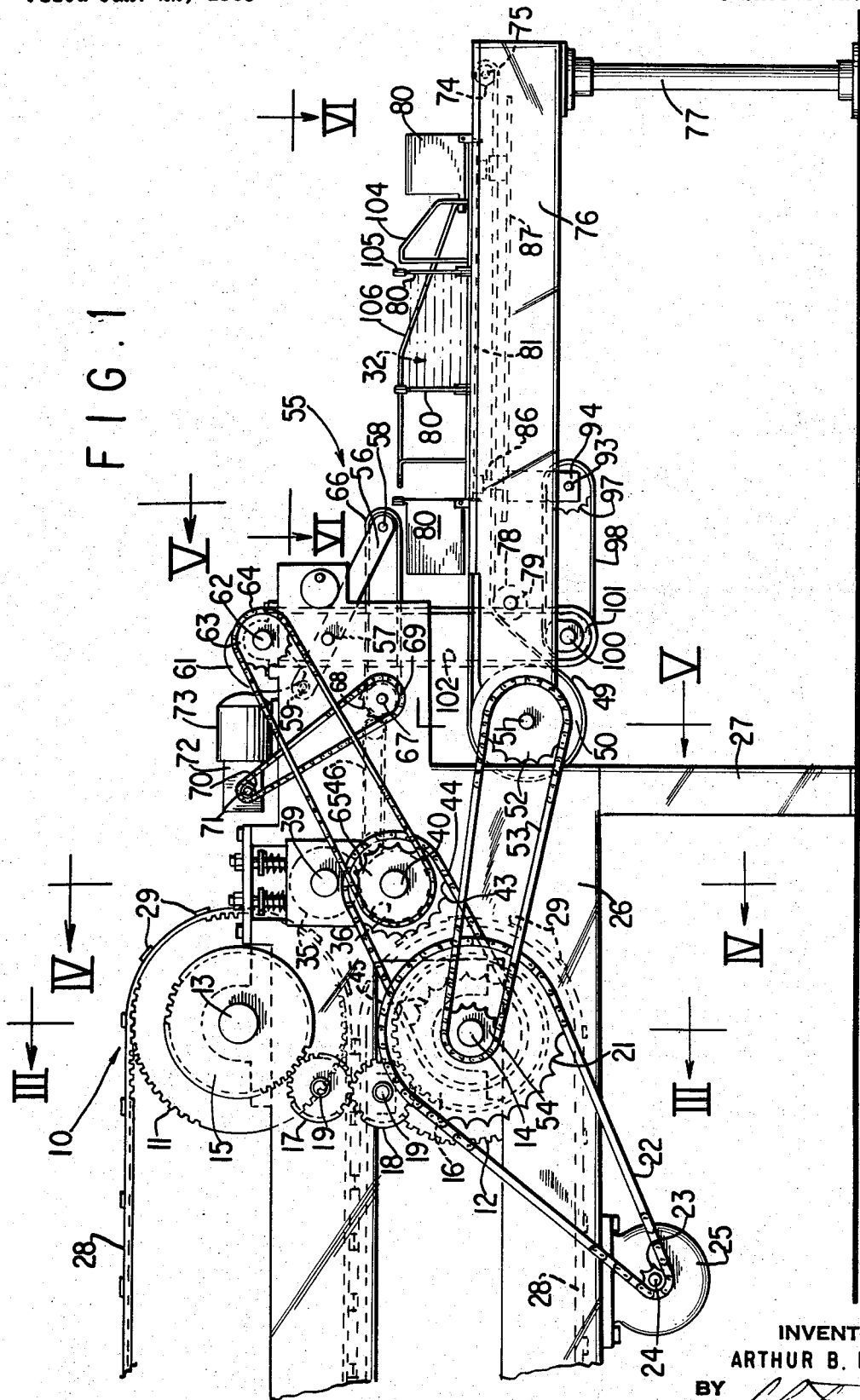
FIG. 1 is a side view of the preferred embodiment of the present invention.
Figure 2:
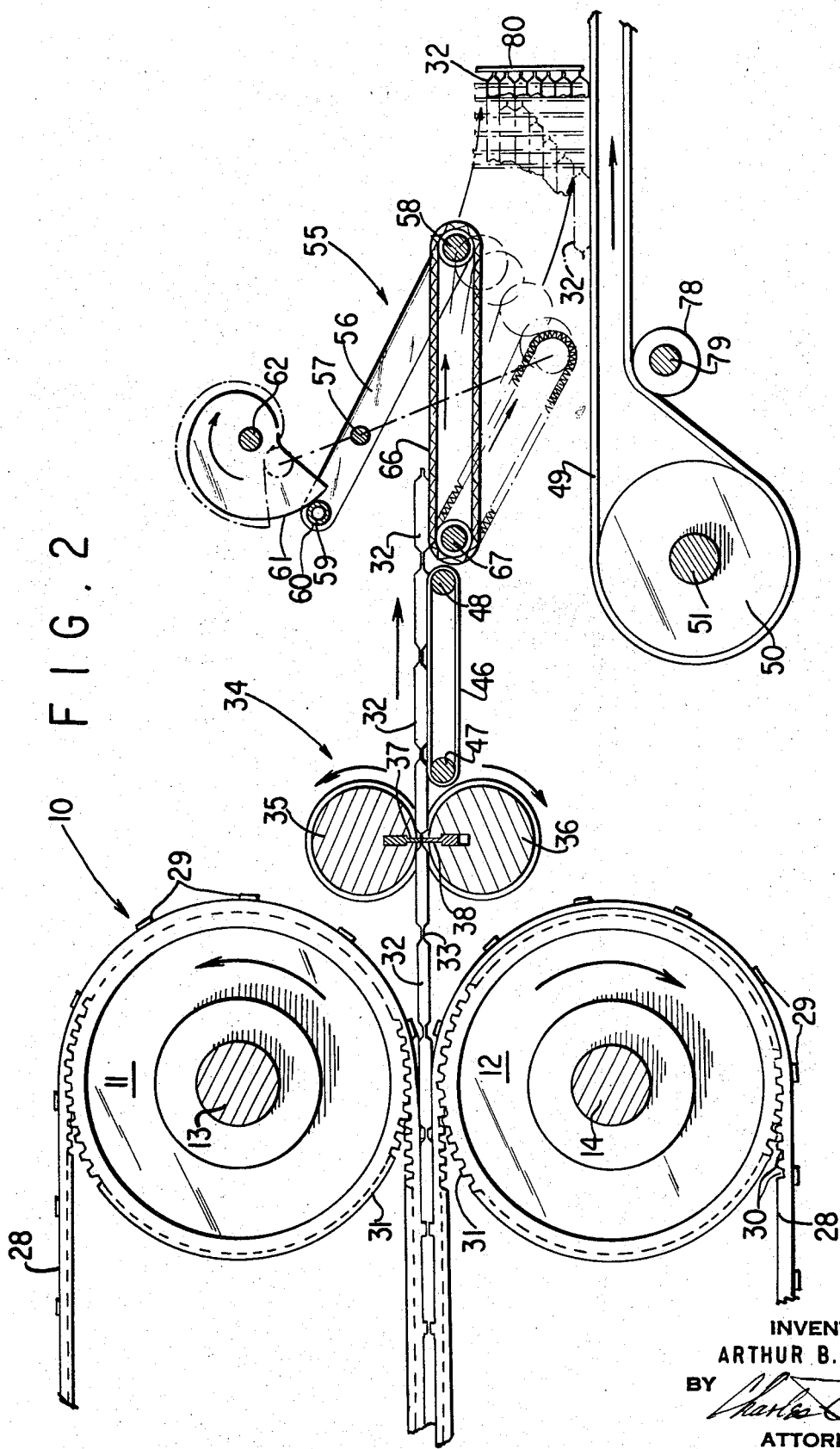
FIG. 2 is a schematic illustration similar to FIG. 1 of the preferred embodiment of the present invention.
Figure 3:
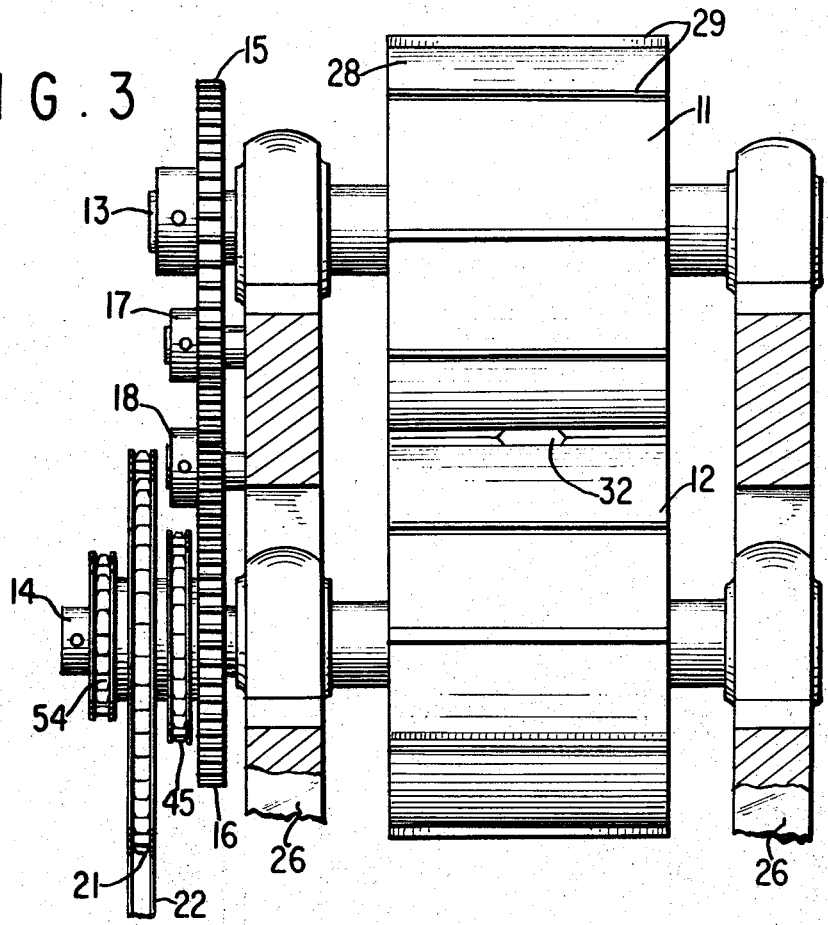
FIG. 3 is a cross-section view taken along the line III—III in FIG. 1.
Figure 4:
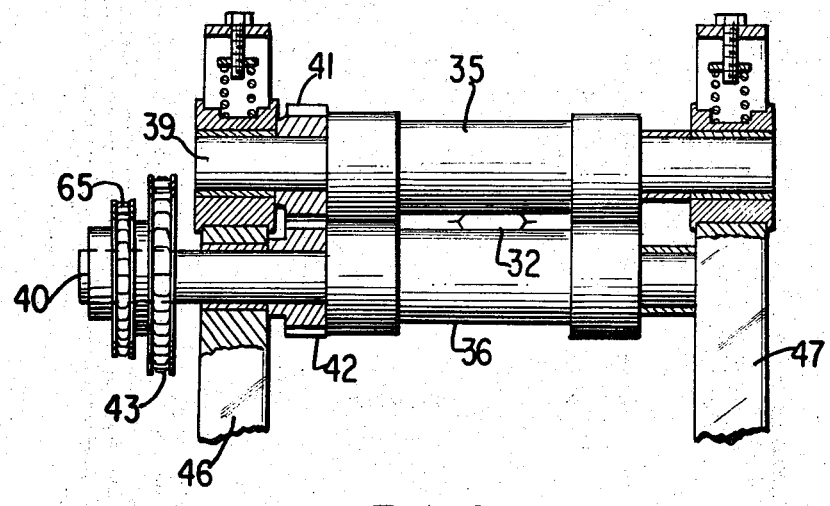
FIG. 4 is a cross-sectional view taken along the line IV—IV of FIG. 1.

Referring to the preferred embodiment of the present invention shown in FIGS. 1 and 2, supply apparatus 10 comprises a pair of parallel cylinders 11 and 12 axially disposed in the same vertical plane. The cylinders are secured, in a conventional manner, to journaled shafts 13 and 14, respectively which are additionally provided with equal diameter spur gear 15 and 16, positioned in the same vertical plane. A pair of mating idler gears 17 and 18, disposed on parallel journaled shafts 19 and 20, mesh with spur gear 15 and 16 as shown in FIG. 1 to insure equal and opposite relative rotation of the cylinders.

The shaft 14 includes a sprocket 21 about which is entrained a chain 22, the latter also is entrained about the sprocket 23 mounted on armature 24. The armature is a part of motor means 25 which imparts torque to shaft 14 and is preferably an electric motor, but may be any other conventional rotational prime mover such as a hydraulic, pneumatic or internal combustion engine. The motor is secured to horizontal brace 26 in a conventional manner such as by brackets and screws. The brace is supported above the foundation by a plurality of stanchions 27.

A pair of continuous flexible belts 28 are entrained about the parallel cylinders 11 and 12 and define a horizontal passage therebetween to advance the materials to be stacked. The belts include spaced lugs 29 of the outer surface thereof between which the sheets to be stacked are disposed as they are moved by the belts. To prevent slippage between the belts and the cylinders, the interior surface of the belts may be provided with spaced grooves 30 which creates traction on the cylinder face or alternatively the cylinder face may be provided with teeth 31 to engage the grooves.

The present invention is especially suitable but not limited to use with a continuous ribbon of wrapped crimped comestible sections produced by the apparatus of our copending application Ser. No. 776,862 filed Nov. 14, 1968. The comestible, preferably meat or cheese, is enveloped in a plastic film and formed into spaced interconnected sections 32 defined by the dimension between the spaced lugs 29 on the belts. The crimped portions 33 between sections 32 are severed by conventional apparatus 34, the latter comprising a pair of parallel cylinders 35 and 36 of the equal diameter and aligned in the same vertical plane. The cylinders include outwardly projecting knives 37 and 38 respectively, which mate to cut crimped sections 33 when positioned in the vertical plane of the cylinders. The cylinders are mounted on journaled, parallel shafts 39 and 40 respectively on which are also mounted gears 41 and 42 which mesh to insure equal and opposite rotational movement of the cylinders.

Shaft 40 includes an additional sprocket 43 about which is drawn chain 44 which extends to and is drivingly entrained about sprocket 45 on driven shaft 14. Thus constructed each blade makes one rotation and mates with the opposite blade in timed relation with the linear movement of the interconnected comestible sections 32 so that each crimped portion 33 is positioned in the vertical plane of the cylinder axis when the blades mate to sever same and form individual sections. Once sliced, the sections are advanced from the cutting apparatus on an independently driven conveyor 46 entrained about rotatable shafts 47 and 48.

A horizontal conveyor belt 49, disposed at a level lower than conveyor 46, is entrained about cylinder 50, the latter being positioned on rotatable shaft 51. A sprocket 52 is mounted on shaft 51 about which is drawn chain 53, the latter being also drivingly engaged about sprocket 54 on driven shaft 14.

Figure 5:
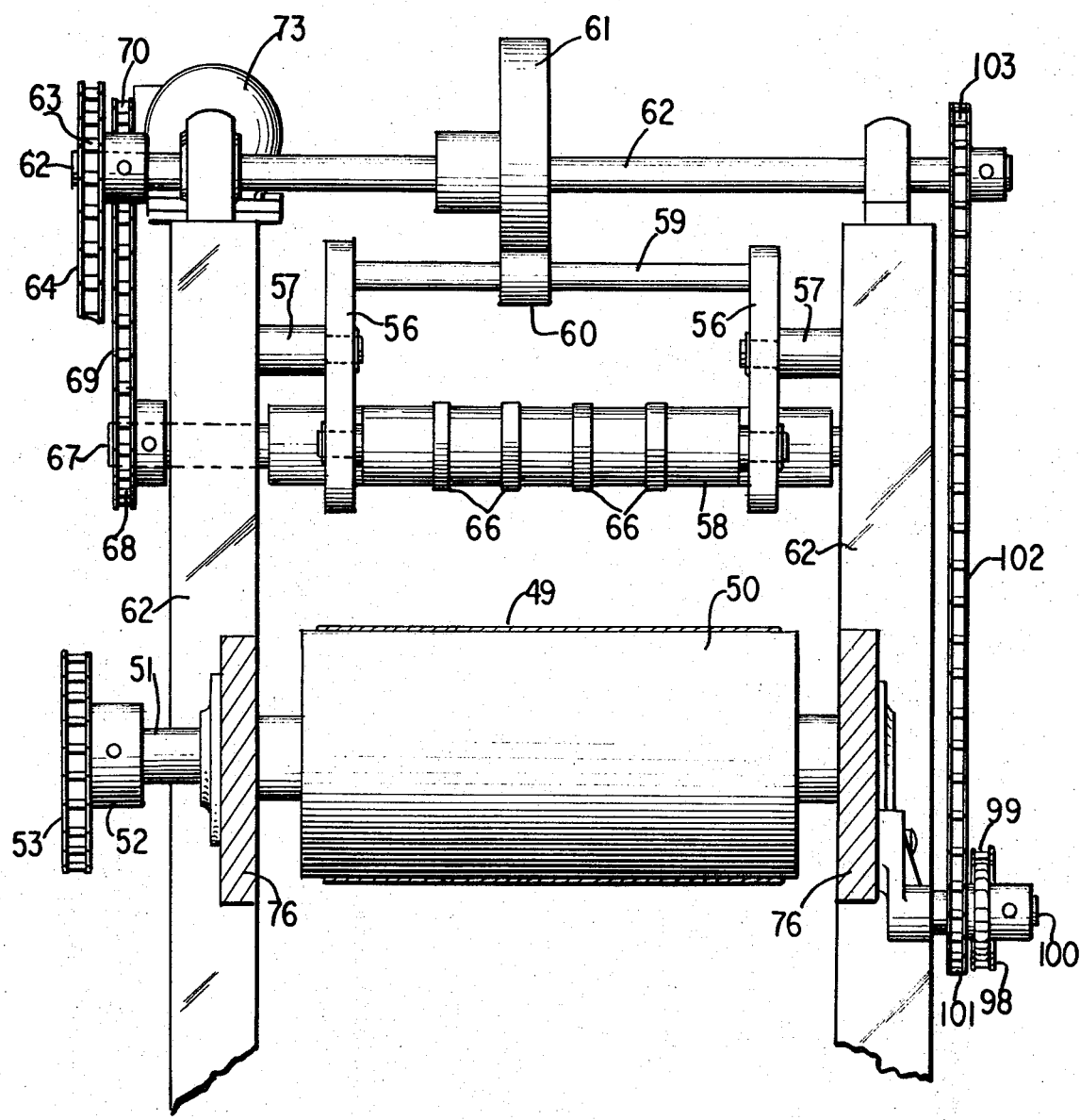
FIG. 5 is a cross-sectional view taken along the line V—V in FIG. 1.

The sliced sections 32 are to be positioned on the moving conveyor 49, in vertical stacks to facilitate easy packaging at a further station. To this end an arm 55 comprising spaced parallel links 56 is provided, each link being rotatable on axially aligned pins 57 journaled in spaced parallel walls 62, as shown in FIG. 5. The free ends of the links are interconnected by rotatable shaft 58 and fixed shaft 59 to insure concurrent movement. A roller 60 is rotatably mounted on fixed shaft 59 adjacent the midpoint and is contacted by cam 61 secured to driven shaft 62. Rotation of the cam rocks the arm 55 about the pins 57 and moves the shaft 58 through a noncircular arc best seen in FIG. 2.

The shape of the cam varies from a narrow diameter to a wide diameter with substantially no dwell period therebetween so that after the arm has been pivoted to its highest point, to position the uppermost section on the stack, it is quickly pivoted downwardly to commence a new stack. The shaft 62 is driven by a chain 64 drawn about sprocket 63 positioned thereon, outside the partitioned walls 26, which is also engaged about sprocket 65 on the shaft 40 driven, via chain 44, by shaft 14. Consequently, the rotational movement of the cam 61 which pivots the arm 55 is coordinated with the linear movement of the sections 32 advanced by driven shaft 14.

A plurality of extensible conveyor belts 66 are entrained about journaled shaft 58 and driven shaft 67, the latter disposed in suitable journals in the walls 26 at a level preferably the same horizontal plane as conveyor 46. As best seen in FIG. 5, a spur gear 68 is provided on shaft 67 outside the walls 26 about which is entrained chain 69. The chain is driven by gear 70 on shaft 71 which projects from conventional speed reducer 72 driven by motor 73. Accordingly, the motor controls the speed of conveyor 66 independently of the movement of conveyor 46, which supplies the sections 32, and conveyor 49 which transports the sections, in stacked position, to a subsequent packaging station. As previously stated, the pivot points 57 of the arm 55 are offset from the horizontal axis of shaft 67 and hence the free end of the arm, which mounts rotatable shaft 58, follows a noncircular arc with respect to shaft 67, actually "reaching out" to position individual sections on top of one another, in a vertical stack, on conveyor 49, moving therebeneath. Stated another way, the shaft 58 which is the point of departure of the sections from the arm follows a path, illustrated in phantom lines in FIG. 2, which includes a linear dimension with respect to the axis 67 to continuously form section stacks on conveyor 49.

The conveyor belt 49 extends horizontally away from the stacking apparatus and is entrained at its opposite end about cylinders 74 secured on shaft 75. The latter shaft is journaled in parallel walls 76 of a conventional table supported by legs 77. As is shown in FIG. 2, a cylinder 78, secured to shaft 79 is also journaled in side walls 76 and is interposed between cylinders 50 and 74 to take up any slack in the conveyor 49.

As shown in FIG. 6, a plurality of rectangular plates 80, are hinged, at one corner, to a horizontally disposed chain 81 for movement into and out of the path of travel of the section stacks on conveyor 49. Conventional fittings 82 each including a pin 83 are disposed in equally spaced relation on the chain to mount the plates for the rotational movement about a horizontal axis. The chain is entrained about gears 84 and 85 on parallel, vertically disposed shafts which are situated so that a portion of path of travel of the chain parallels the conveyor 49. As seen in FIG. 10, gear 85 is secured on the upper end of vertically disposed shaft 86, the latter being rotatably mounted in and projecting through journals 89 and 90 of table 87. Disposed on the lower free end of shaft 86 is bevel gear 91 which meshes with beveled gear 92 secured on horizontally disposed shaft 93.

Shaft 93 is mounted for rotation, about a horizontal axis, in a pair of conventional roller bearings 95 and 96 provided in depending brace 94 from table 87. On the free end of shaft 93 is a spur gear 97 about which is entrained a chain 98 which is likewise drawn about spur gear 99 on the rotatable shaft 100, as illustrated in FIG. 5.

The shaft 100 is journaled in the partitioned walls 26 and includes spur gear 101 about which is entrained chain 102. Chain 102 extends upwardly and is drawn about spur gear 103 on shaft 62 driven, via chains 64 and 44, by shaft 14. From this construction, it is apparent that the horizontally disposed chain 81 which pivotally supports plates 80 is synchronized with the movement of conveyors 46 and 49 and cam 61, all driven by shaft 14. This synchronous movement is essential since the plates 80 are to be advanced at same linear speed as conveyor 49 to provide a support against which the sections are positioned by the momentum imparted by conveyor 66 to define a smooth vertical face on one side of the stack. Suitable guides may be provided on opposite sides of the conveyor to insure smooth side faces though in practice, this has not been necessary.

The spacing of the hinged plates 80 on chain 81 permits a plurality of stacks to be disposed equally between them. FIG. 7 illustrates the operative position of one of the plates overlying conveyor 49 against which sections are positioned by the arm 55 as the conveyor and chain 81 are moved.

Each plate 80 is provided with a roller 105 rotatably mounted on the upper face of the plate, preferably on the inner edge in the same vertical plane as fitting 82.

A guide rod 104 secured to table 87 projects outwardly over the chain 81 and includes a leg portion which engages the outer face of the roller 105 to rotate the plate 80 about a horizontal axis defined by a pin 83 to the inoperative position illustrated in solid lines in FIG. 8. The phantom lines of FIG. 8 illustrate the plate midway between the inoperative and operative position and engaging the guide rod 104 in order to pivot the plate from the inoperative to operative position, a guide rod 106 is disposed on the opposite portion of the chain 81 which likewise engages the roller 105 and rocks the plate about the horizontal axis of pin 83 to position same as shown in FIG. 7. FIG. 9 best illustrates the movement from the inoperative to operative position.

OPERATION

In practice, a continuous ribbon of wrapped comestible is supplied by the belts 28 which is defined into sections 32 interconnected by crimped portions 33 by lugs 29. Cutting apparatus 34 severs the crimped portions and forms individually wrapped comestible sections. Thereafter, conveyor 46 advances the sections onto conveyor 66 of the stacking arm 55 and the latter is pivoted by the rotation of the cam 61. The sections are positioned, one on top of another, on the moving conveyor 49 passing therebeneath and against one of the plates 80 moving at the same speed as the conveyor. The period of one rotation of the cam permits the arm to deposit the desired number of sections to form one stack, and when the shaft 58 has been swung to its highest point to deposit the uppermost section on the stack, the roller 61 on the opposite end of arm 55 contacts the widest diameter of the cam. At this point the arm has reached out to its farthest limit to place the last section of the stack, and will clear the completed stack when swung in a clockwise direction downwardly to begin a new stack. It should be apparent that the arc defined by the rotatable shaft 58 may be varied with respect to the driven shaft 67 by repositioning the location of the pins 57 in walls 26. This change would necessitate relocation of the cam 61 to contact roller 60 on the arm or might require a new cam altogether but would result in a greater lengthwise reaching out of the arm to obtain optimum positioning of the sheets for higher stacks or a greater number of sheets per stack. The downward movement of the arm is achieved by the roller 61 following the face of the cam to the narrow diameter, and a clockwise moment imposed on the arm by the tension in the stretched belts 66. The completed stack now serves as the vertical support for the new stack to be formed on the conveyor. Preferably at least two stacks are established between each pair of plates 80. The neatly stacked sections are advanced along conveyor 49 and guide 104 rotates the plate 80 to the inoperative position. Thereafter, the stacks are received in the packaging station and placed in boxes.

Although one embodiment of the present invention has been herein illustrated and described, it will be evident to those skilled in the art that various modifications may be incorporated into the details of production without departing from the principles herein set forth.

What is claimed is:

1. Apparatus for continuously stacking sheets on a moving conveyor comprising first conveyor means for continuously delivering sheets, second conveyor means for transporting stacked sheets to subsequent stations, stacking apparatus interposed between said first and second conveyors for producing vertical, juxtaposed sheet stacks on said second conveyor comprising a driven shaft, an arm pivotally mounted about an axis parallel to said driven shaft, said arm having a rotatable shaft at one end thereof, an extensible belt entrained about said driven and rotatable shaft for receiving said sheets from first conveyor, means for pivoting said arm through a predetermined arc whereby said rotatable shaft passes through a noncircular arc with respect to said driven shaft to reach out and position sheets in stacks on said second conveyor means as the latter is moved.

2. Apparatus according to claim 1 wherein said second conveyor means is disposed at a level lower than said first conveyor means, said driven shaft being disposed in approximately the same plane as said first conveyor, and said axis is offset from said driven shaft.

3. Apparatus according to claim 1 including a roller mounted on the free end of said arm, said pivoting means including a cam engaging said roller, said cam including a narrow diameter and a wide diameter interconnected by a radially inwardly projecting portion defining substantially no dwell period and means for rotating said cam whereby said arm is swung through said arc.

4. Apparatus according to claim 3 wherein said cam is rotated in timed relation with said first conveyor means.

5. Apparatus according to claim 1 including a plurality of plates movable into and out of the path of travel of said sheets on said second conveyor against which said sheets are positioned to form a vertical stack.

6. Apparatus according to claim 5 wherein said plates are advanced at the same rate of linear speed as said second conveyor.

References Cited

FOREIGN PATENTS 1,280,206  11/1961  France.

EDWARD A. SROKA Primary Examiner